United States Patent [19]

Eisenhardt et al.

[11] 4,049,058
[45] Sept. 20, 1977

[54] SUGAR BEET HARVESTER

[75] Inventors: Fred W. Eisenhardt, Fargo, N. Dak.; Wayne S. Tonsfeldt, Savin, Minn.

[73] Assignee: Alloway Manufacturing, Inc., Fargo, N. Dak.

[21] Appl. No.: 608,741

[22] Filed: Aug. 28, 1975

[51] Int. Cl.² ........................................... A01D 19/00
[52] U.S. Cl. ...................................................... 171/58
[58] Field of Search .................... 171/50, 53, 55–62, 171/84; 198/129; 280/43

[56] References Cited

U.S. PATENT DOCUMENTS

| | | | |
|---|---|---|---|
| 3,653,445 | 4/1972 | Barnes | 171/58 |
| 3,791,451 | 2/1974 | Zaum et al. | 171/58 |
| 3,792,733 | 2/1974 | Crandall et al. | 171/58 |
| 3,809,164 | 5/1974 | Hook et al. | 171/58 |
| 3,968,842 | 7/1976 | Puch et al. | 171/61 X |

Primary Examiner—Russell R. Kinsey
Attorney, Agent, or Firm—Burd, Braddock & Bartz

[57] ABSTRACT

A machine for lifting sugar beets from the soil, separating the soil and foreign matter from the sugar beets and elevating the sugar beets for loading on a transport vehicle. The machine has beet lifting wheels which lift the beets from the soil and direct the beets to link conveyors. The conveyors carry the beets to one end of a grab and cleaning roller assembly. The grab and cleaning roller assembly has a plurality of smooth and spiral ribbed rollers that are rotated to clean and move the beets the length of the roller assembly to a disc assembly. The disc assembly comprises a plurality of discs that are rotated in a direction to move the beets to the inlet area of a loading elevator. The loading elevator is independently supported on the ground with a wheel assembly. Adjusting structure is used to adjust the heighth of the elevator. Separate controlled hydraulic motors are operable to drive the conveyors, the disc assembly and the loading elevator. A pump mounted on the machine is operable to deliver hydraulic fluid under pressure to the separate hydraulic motors.

45 Claims, 11 Drawing Figures

SUGAR BEET HARVESTER

BACKGROUND OF THE INVENTION

Sugar beet lifting and loading machines are used to remove sugar beets from the soil and load the beets on a transport vehicle, as a truck or trailer. Upwardly directed loading conveyors mounted on the machines move the sugar beets from the side of the lifting and loading machines to transport vehicles. The machines use conveyors and grab rollers to separate the soil and other foreign material from the beets as the beets travel from the lifting wheels to the elevator conveyors. An example of this type of machine is shown by Rollins in U.S. Pat. No. 3,399,766. The Rollins machine has transversely positioned grab and cleaning rollers located behind the beet lifting wheels. A disadvantage of this type of machine is that all of the beets lifted by the lifting wheels so not travel the full length of the grab and cleaning rollers. The result is that some of the beets are not sufficiently cleaned of soil and foreign material before they enter the elevator conveyor. Structures, such as horizontal rods, have been used to direct the beets in a lateral direction away from the elevator so that the beets will engage a greater length of the grab and cleaning rollers. These structures do not provide for an even flow of beets and at times overload the grab and cleaning rollers so that all of the beets are not cleaned. Other types of sugar beet harvesters are shown in U.S. Pat. Nos. 2,608,814 and 3,734,193. These harvesters use pairs of rollers to move and clean the sugar beets from the lifting wheels to the loading conveyors. The rollers carry the beets rearwardly onto the cross and loading conveyors.

SUMMARY OF THE INVENTION

The invention is directed to a machine for lifting root crops, as sugar beets, potatoes and the like from the soil and delivering the crops to a loading location such as a transport vehicle. More specifically, the machine is a sugar beet harvester having means for lifting the beets out of the soil, means for cleaning the beets, and elevator means for directing the cleaned beets to a transport vehicle. A first open link conveyor carries the beets rearwardly from beet lifting wheels to a second cross open link conveyor. The second conveyor moves the beets to an inlet or receiving area of a grab and cleaning roller assembly. All of the beets move the full length of the grab and cleaning roller assembly and are discharged into the receiving area of a disc assembly. The grab and cleaning roller assembly has a plurality of longitudinal roller located in general parallel alignment with each other. Alternate rollers have outwardly directed spiral ribs. The remaining rollers have smooth outer cylindrical surfaces. The disc assembly has a plurality of rows of upright discs or rienks that rotate about horizontal axes. The discs deliver the beets to an inlet of a loading conveyor.

The loading conveyor is independently supported with a wheel structure on the ground. The loading conveyor has the beams that are pivotally mounted on the side of the frame of the machine. The wheel structure comprises a rocking beam and tandem wheel arrangement connected to the beams. An elevator structure is pivotally mounted on the beams. An adjusting structure located between the beams and the elevating structure is used to change the elevation of the elevating structure.

Hydraulic motors are used to drive the conveyors, the disc assembly, and the loading conveyor. A mechanical drive, as belt and pulley structure, operates the grab and cleaning rollers. A power takeoff drive connects the towing prime mover, as a tractor, with a pump mounted on the machine. The power takeoff drive is also connected to the drive for the grab and cleaning rollers. The hydraulic system for the machine includes controls whereby each of the hydraulic motors can be individually controlled so that the speeds of the conveyors, discs and loading conveyors can be individually adjusted.

An object of the invention is to provide a sugar beet harvesting machine with grab and cleaning rollers and conveyor structure operable to deliver beets to one end of the rollers so the beets move and are cleaned the full length of the rollers. A second object of the invention is to provide a sugar beet harvesting machine with a loading elevator that is self-supported adjacent one side of the front of the machine. Another object of the invention is to provide a crop elevator for a harvesting machine that is independently supported and vertically adjustable. A further object of the invention is to provide a sugar beet harvesting machine with full length cleaning grab rolls that are located generally in the same plane as a cross crop moving conveyor. Another object of the invention is to provide a root crop harvesting machine with independent hydraulic drive motors operable to independently vary the speed of the crop conveyors, grab and cleaning rollers and elevator. A still further object of the invention is to provide a row crop harvesting machine with drive structure that is independently adjustable with respect to the ground speed of the machine whereby the speed of the machine can be controlled relative to the harvesting conditions to provide for maximum harvesting efficiency. Another object of the invention is to provide a drive for an elevator of a sugar beet harvesting machine that can be stopped independently of the operation of the machine by the operator of the machine.

DESCRIPTION OF PREFERRED EMBODIMENT

Figure 1:
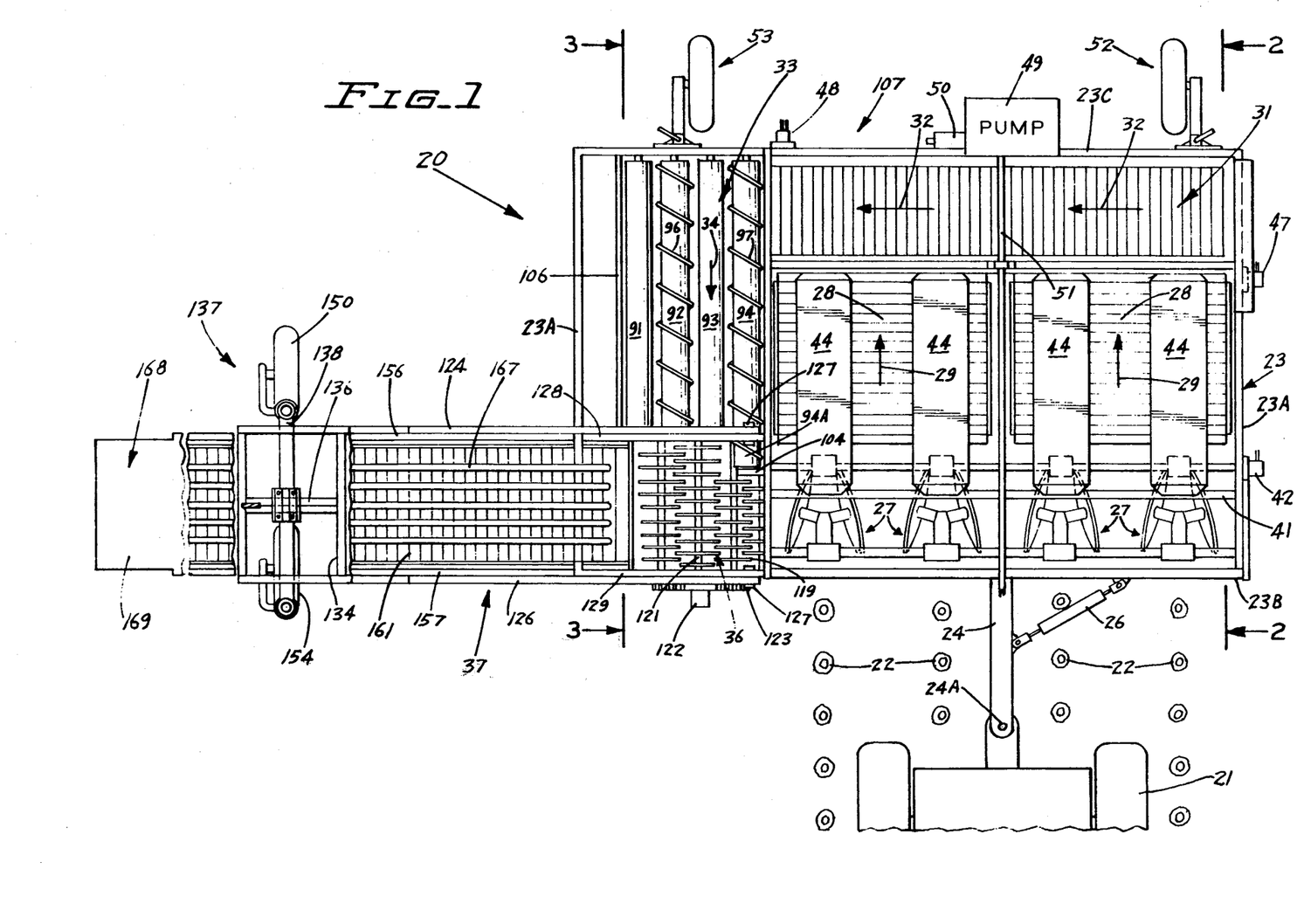
FIG. 1 is a top plan view of the sugar beet lifting and loading machine of the invention.

Referring to the drawing, there is shown in FIG. 1 an overall top plan view of the lifter loader machine or root crop harvester of the invention indicated generally at 20. Machine 20 is towed by a tractor 21 in a field of parallel rows of root crops 22, as sugar beets. The sugar beets have their tops removed with a defoliator machine as shown in U.S. Pat. No. 3,583,136 and are scalped with a unit as shown in U.S. Pat. No. 3,871,161. The following description is directed to use of the machine to harvest sugar beets. Other root crops as potatoes, onions, carrots and the like may be harvested with the machine.

Machine 20 has a generally rectangular primary frame 23 comprising longitudinal side beams 23A and transverse front and rear beams 23B and 23C. A forwardly directed tongue 24 is connected to the midportion of the front beam of frame 23B. Tongue 24 is releasably connected to towing tractor 21 with a conventional clevis and pin structure 24A. An adjustable link 26 is connected to tongue 24 and a portion of frame 23 to adjust the angular position of tongue 24 relative to the frame.

A plurality of lifting wheel units indicated generally at 27 are mounted on the forward portion of the frame. Lifting wheel units 27 are conventional beet lifting wheels comprising a pair of rearwardly converging discs 27A rotatably mounted on a support structure 27B connected to a portion of the frame. The discs 27A penetrate the soil and rotate on forward movement of the machine to lift the beets 22 out of the soil. The lifting units 27 are located in longitudinal alignment with the rows of beets 22 whereby on forward movement of the machine 20 the beets are lifted from the soil and moved to a pair of first longitudinal conveyors 28. Conveyors 28 function to move the beets in a rearward direction, as shown by arrow 29, onto a transverse conveyor indicated generally at 31. Transverse conveyor 31 moves the beets in a transverse or lateral direction as indicated by arrow 32 to a grab and cleaning roller assembly indicated generally at 33. Conveyors 28 and are open type transverse link or rod conveyors comprising endless spud chains which allow the dirt and small rocks to be separated from the beets as they are moved by conveyors 28 and 31 to the grab and cleaning roller assembly 33.

Grab and cleaning roller assembly 33 located on one side of frame 23 comprises a plurality of longitudinally disposed rollers 91, 92, 93 and 94 which function to turn and move the beets in a forward direction, as indicated by arrow 34. The turning and moving of the beets by the rollers further cleans the soil from the beets. Cross conveyor 32 delivers the beets to one end or beet receiving area of the grab and cleaning roller assembly 33. All of the beets move along the length of the grab and cleaning roller assembly 33 which delivers the beets to a disc assembly indicated generally at 36. Disc assembly 36 has a plurality of rotating discs or rienks which deliver the beets to a loading conveyor indicated generally at 37. Loading conveyor 37 operates to move the beets upwardly and laterally whereby the beets can be dumped into a transport vehicle, as a box of a truck or trailer, moving along with the machine 20.

Figure 2:
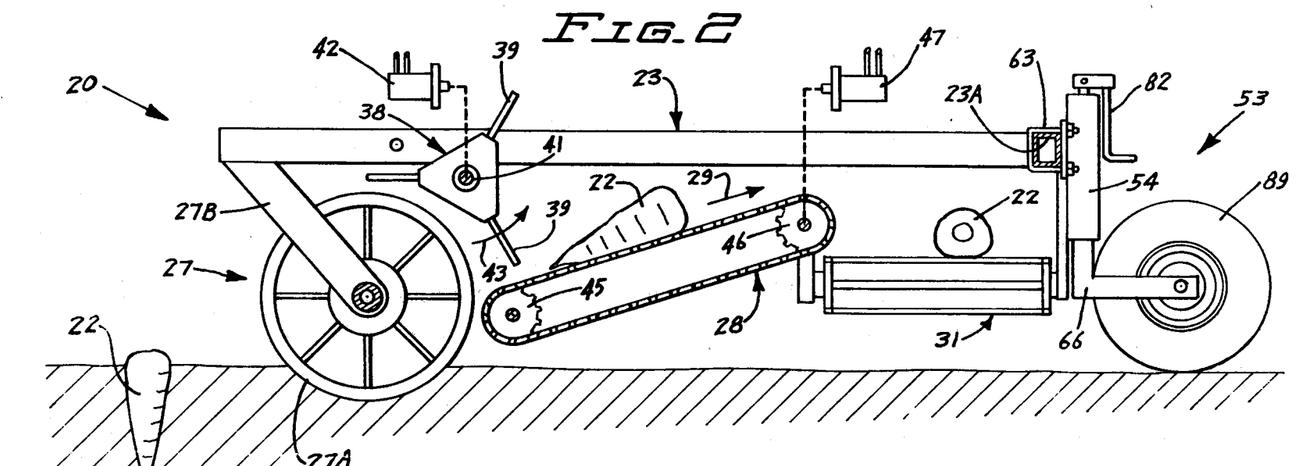
FIG. 2 is an enlarged sectional view taken along line 2—2 of FIG. 1.

Referring to FIG. 2, lifting wheel units 27 moves the beets upwardly between adjacent discs 27A. A rotatable spider 38 having outwardly directed flexible arms 39 is operable to move the beets onto the first conveyor 28. Spider 38 is mounted on a transverse shaft 41 driven by a hydraulic motor 42. Arms 39 move in the direction of arrow 43 to pick up the beets from between the discs 27A and move the beets in a rearward direction onto conveyor 28. A longitudinal shield or bang board 44 is located above the spider 38 to deflect the beets onto the conveyor 28. Conveyor 28 is trained about lower idler sprockets 45 and upper dirve sprockets 46. A hydraulic motor 47 is connected to the drive sprockets 46 to move the conveyor 28 in the direction of arrow 29.

As shown in FIG. 1, a third hydraulic motor 48 is drivably connected to sprockets (not shown) for the conveyor 31. On operation of motor 48, conveyor 31 moves the beets in the direction of arrow 32 onto the receiving or rear end of the grab and cleaning roller assembly 33. The discharge end of conveyor 31 is generally at the same elevation as the rollers of the grab and cleaning roller assembly 33. The hydraulic motors 42, 47 and 48 are connected with suitable lines to a pump 49. Pump 49 is mounted at the midsection of the rear cross beam of frame 23. A forwardly directed PTO drive 51 connects the pump to tractor 21. Fluid flow controls 50 are provided for each hydraulic motor 42, 47 and 48 so that the speeds of each of the motors can be separately adjusted in accordance with the operating conditions of the machine. The motors 42, 47 and 48 can be speeded up to improve cleaning efficiency to reduce clogging in muddy harvesting conditions or can be slowed down in good harvesting conditions to minimize beet bruising.

The rear of frame 23 is supported by a pair of wheel assemblies indicated generally at 52 and 53 above the ground. Wheel assemblies 52 and 53 are identical in structure and are operable to adjust the elevation of the rear part of the machine. A detailed showing of wheel assembly 52 is shown in FIGS. 4, 5 and 6.

Figures 4, 5, 6:
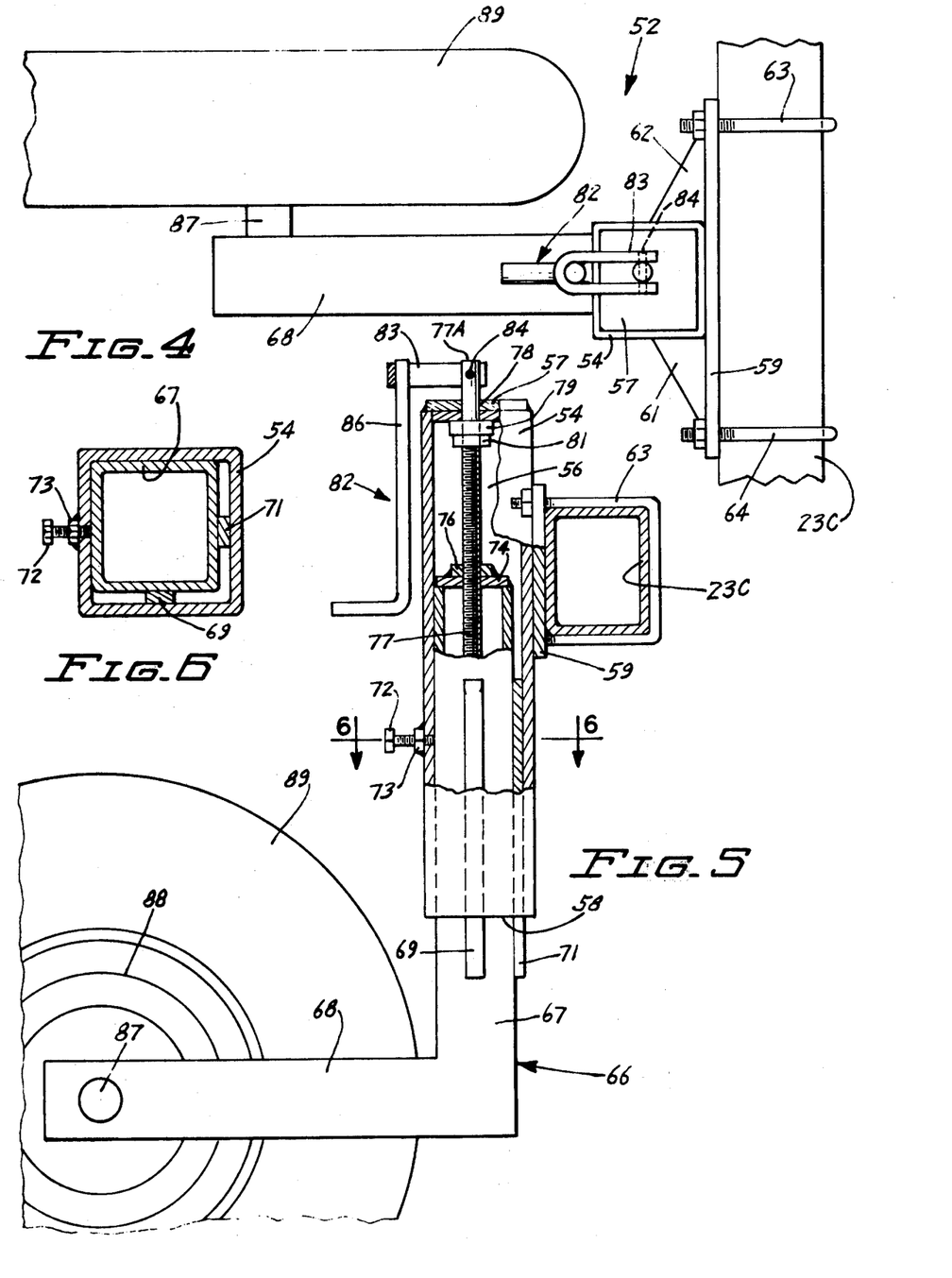
FIG. 4 is an enlarged top plan view of a vertically adjustable wheel assembly of the machine of FIG. 1.
FIG. 5 is a side elevational view, partly sectioned, of the wheel assembly of FIG. 4.
FIG. 6 is an enlarged sectional view taken along the line 6—6 of FIG. 5.

Referring to FIGS. 4, 5 and 6, wheel assembly 52 has an upright tubular member 54 having an upright passage 56. Member 54 has a square cross section. The upper end of member 54 is closed with a cover or plate 57. The bottom 58 is open. A transverse upright plate 59 is secured by welds or the like to the front upright side of member 54. Plate 59, as shown in FIG. 4 extends laterally from the opposite sides of member 54 and is reinforced with gusset plates 61 and 62 which extend between and are secured to the opposite sides of member 57 and plate 59. A pair of U-bolt and nut assemblies 63 and 64 clamp plate 59 on the frame beam 23C.

Wheel assembly 52 has a second right angle member indicated generally at 66 movably positioned relative to the member 54. Right angle member 66 has a first upright section 67 located in telescopic relation with respect to member 54. Member 67 has an upper portion that extends into the passage 56 through the open end 58. Member 66 has a second rearwardly directed horizontal section 68. A pair of upright spacer or slide member 69 and 71 are secured to two sides of member 67 and engage the adjacent two inside wall surfaces of member 54. As shown in FIG. 6, two sides of member 67 are in flat sliding engagement with two sides of the inside of member 54. Slide members 69 and 71 are in engagement with the opposite two inside surfaces of member 54. A bolt 72 threaded through nut 73 functions to lock the member 67 in an adjusted position relative to member 54. Nut 73 is welded to the outside of member 54.

As shown in FIG. 5, a plate 74 carrying a nut 76 is secured to the top of member 67. An upright screw 77 is threaded through nut 76 and extends upwardly through plate 57 terminating in an upper end 77A. End 77A projects through a hole 78 in plate 57. Located below plate 57 is a bearing 79, as a roller or thrust bearing. Bearing 79 rides on a shoulder or collar 81 secured to or forming part of the screw 77. A hand crank indicated generally at 82 is mounted on end 77A and is used to turn screw 77. Crank 82 has a U-shaped member 83 connected with a pivot pin 84 to end 77A. A generally L-shaped handle 86 is located in the base of the U-shaped member 83 and is secured thereto to complete the crank.

As shown in FIGS. 4 and 5, a laterally directed axle 87 is secured to the outer end of section 68. A wheel 88 having a pneumatic tire 89 is rotatably mounted on axle 87.

In use the elevation of the frame beam 23C is adjusted by changing the overall length of the members 54 and section 67. This is achieved by releasing the bolt 72 and turning the crank 82. The screw 77 is free to turn as it is protected from dirt and foreign materials as it is located in the passage 56 and the passage of section 67. The bearing 79 is also located in passage 56, thereby protecting the bearing from moisture and dirt.

Figure 3:
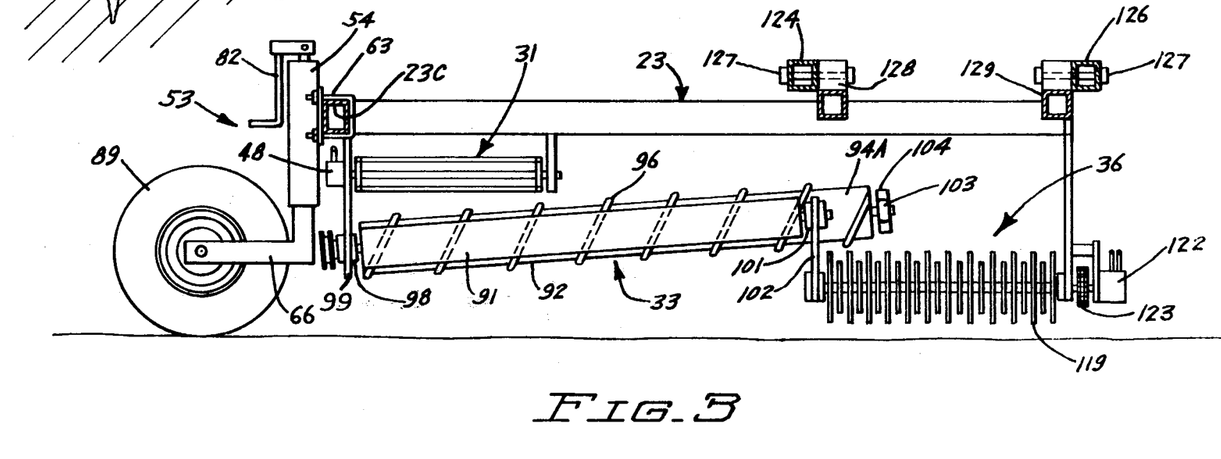
FIG. 3 is an enlarged sectional view taken along line 3—3 of FIG. 1.

Referring to FIGS. 1 and 3, grab and cleaning roller assembly 33 has four longitudinal rollers 91, 92, 93 and 94. Rollers 92 and 94 have spiral ribs 96 and 97. Roller 94 has a forward end section 94A that extends over the disc assembly 36. A bearing 98 supports roler 91 on a wall 99 secured to the frame 23. In a similar manner, a bearing 101 supports the opposite end of roller 91 on a wall or support 102 secured to the frame 23. Similar bearings support opposite ends of the rollers 92, 93 and 94. The forward end of the roller 94 is mounted in a bearing 103.

Bearing 103 is attached to an arm 104 secured to the frame 23 of the machine. An upright longitudinal wall 106 located adjacent the roller 91 to confine the beets to the area above the rollers. Wall 106 comprises a plurality of horizontal rods having opposite ends secured to the frame structures 23A and the corresponding front frame structures.

Figure 7:
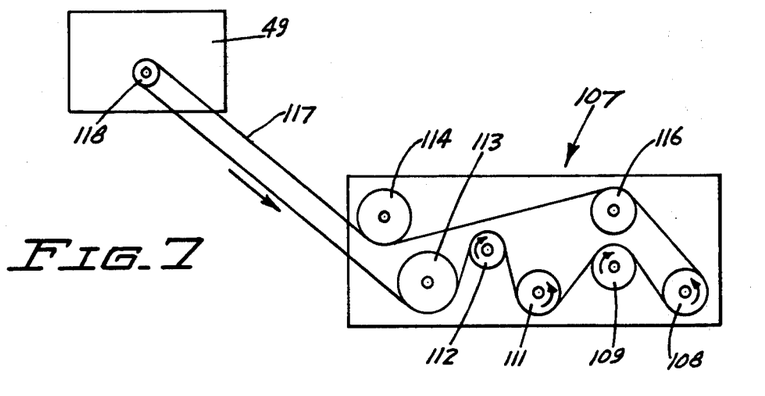
FIG. 7 is a diagrammatic view of the power tansmitting belt and pulley drive for the grab and cleaning roll assembly.

Referring to FIG. 7, a drive means 107 for the rollers is diagrammatically shown connected to the drive of pump 49. Drive means 107 is an endless belt and pulley arrangement or chain and sprocket structure comprising pulleys 108, 109, 111 and 112 connected to the ends of the rollers 91, 92, 93 and 94 respectively. Belt 117 is trained about idler pulleys 113, 114 and 116 which serve to guide the belt and place the belt under proper tension. Belt 117 is an endless V-type belt extended about a drive pulley 118. The drive pulley 118 is mounted on the drive shaft of the pump 49. The drive shaft is operated by the tractor 21 through the power takeoff drive 51. On the application of power to the drive pulley 118 the belt 117 is moved in the direction of the arrow and thereby rotate the smooth and ribbed rollers in opposite directions. The ribbed rollers 92 and 94 can be driven faster than the smooth rollers 91 and 93.

Referring to FIGS. 1 and , disc assembly 36 comprises a plurality of upright discs or rienks 119 mounted on three generally longitudinal shafts 121. The discs 119 are spaced on the shafts 121 and have irregular shaped outer peripheries as a hexagonal shape. A hydraulic motor 122 operates through a chain and sprocket drive 123 to rotate the shafts 121 in common directions. Discs 119 are rotated in the counter clockwise direction to deliver the beets to the inlet of the loading elevator 37. The motor 122 is connected to the pump 49 with suitable lines. Control unit 122A connected to lines is used to control the flow of hydraulic fluid to the motor 122 so that the speed of operation of the motor 122 can be adjusted.

Figure 8:
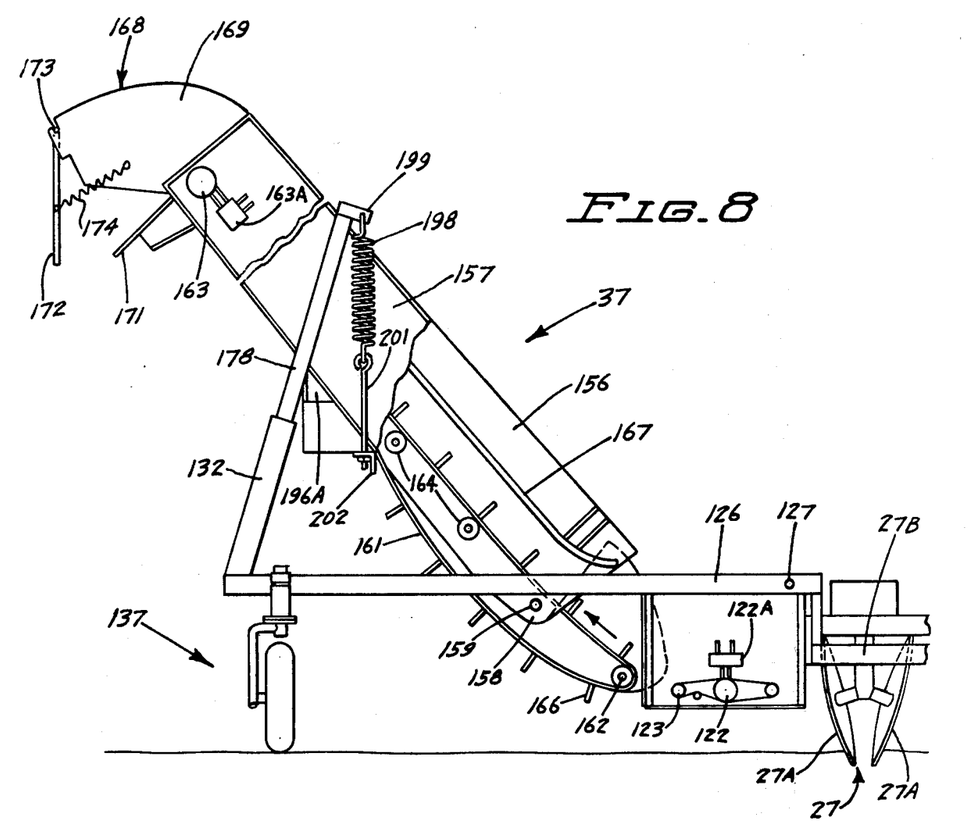
FIG. 8 is a front elevational view of the loading conveyor of the machine of FIG. 1.
Figures 9, 10:
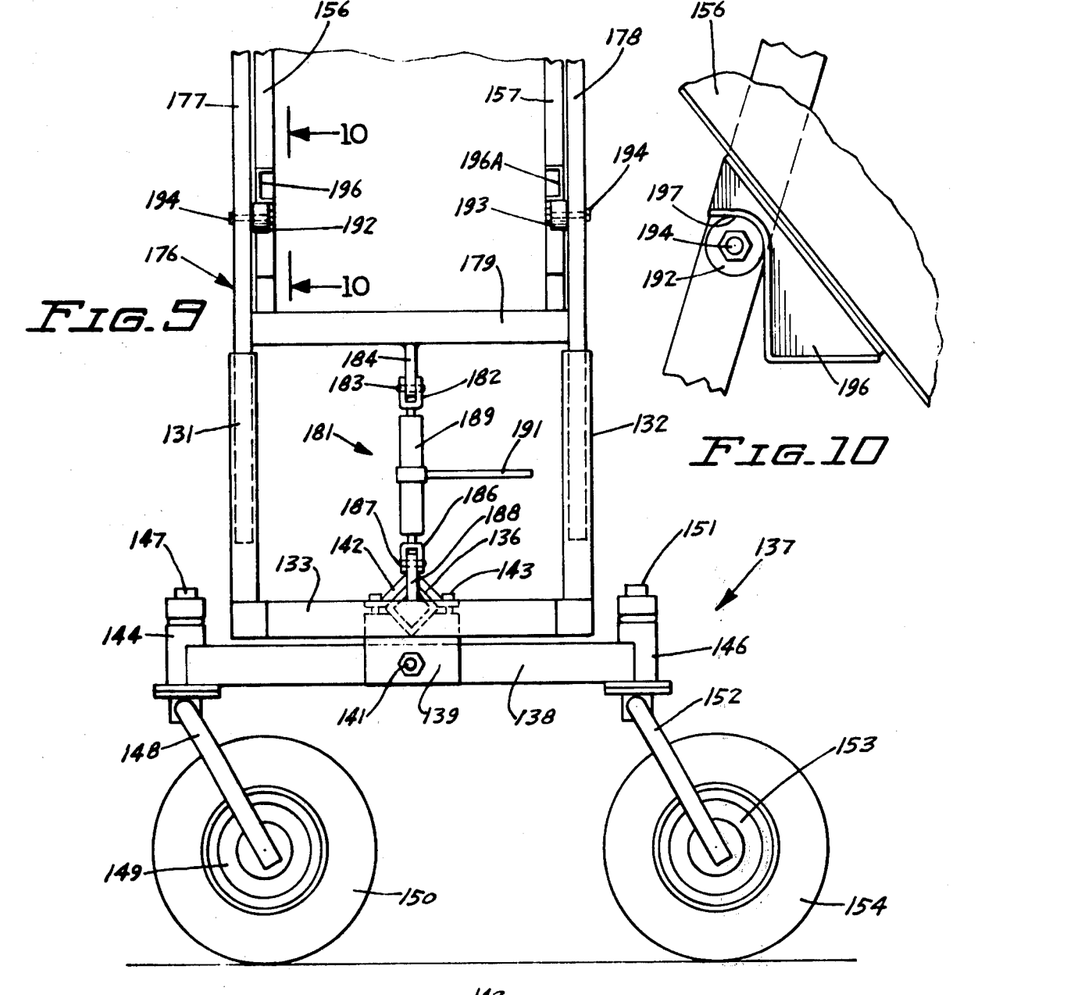
FIG. 9 is an enlarged side elevational view of the supporting structure of the loading elevator of FIG. 1.
FIG. 10 is an enlarged sectional view taken along line 10—10 of FIG. 9.

Loading conveyor 37 extends laterally from the front portion of the side of frame 23. Loading elevator 37 has a pair of lateral beams 124 and 126. Pivots 127 pivotally connect the ends of the beams 124 and 126 to lateral frame members 128 and 129. As shown in FIGS. 8 and 9, upright tubular arms 131 and 132 are secured to the outer ends of the beams 124 and 126. An end member 133 connects the lower ends of the arms 131 and 132 and the ends of beams 124 and 126. As shown in FIG. 1, a second end or cross member 134 extends between and is connected to the beams 124 and 126. A short transverse member 136 is connected to the middle sections of end member 133 and cross member 134. Beams 124 and 126 and members 133 and 134 comprise the elevator frame.

Figure 11:
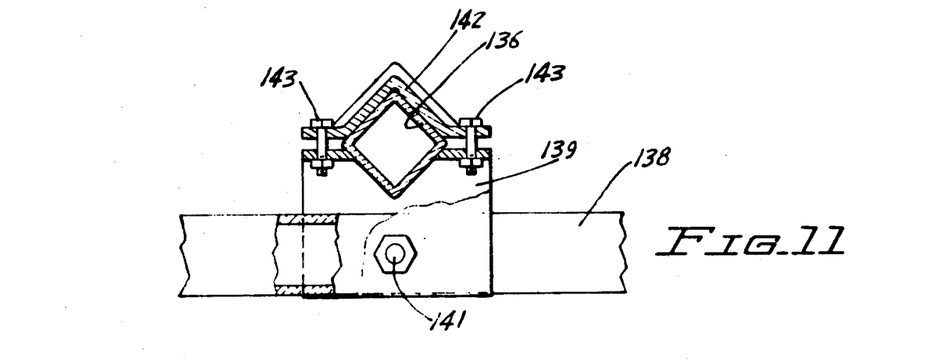
FIG. 11 is an enlarged side elevational view, partly sectioned, of the connecting structure between the pivoted beam of the elevator support structure and the elevator frame.

A floating beam and tandem wheel assembly indicated generally at 137 is mounted on the member 136 to support the elevator independently of the frame. A counterweight on the frame is not needed to compensate for the weight of a loading elevator. As shown in FIG. 9, wheel assembly 137 has a longitudinal rocking beam 138. The middle of beam 138 is connected to a generally inverted U-shape clamp body 139 with a pivot pin 141. A right angle back member 142 is connected to the body 139 with a pair of nut and bolt assemblies 143. As shown in FIG. 11, body 139 and back 142 are clamped about the member 136. This clamp structure allows the wheels to be adjusted in or out along member 136 for different row spacings. Other types of mounting structure can be used to pivotally connect the beam 138 to lateral member 136.

Upright sleeves 144 and 146 are secured to the opposite ends of beam 138. Sleeves 144 and 146 are located adjacent the outsides of the beams 124 and 126 and have upright passages for accommodating spindles 147 and 151 of caster wheels. Upright spindle or shaft 147 is rotatably located in sleeve 144. A downwardly and angularly inclined arm 148 is attached to the lower end of shaft 147. The lower end of arm 148 has an axle carrying a wheel 149. Wheel 149 has a pneumatic tire 150. A similar caster wheel structure is mounted in sleeve 146. Upright shaft or spindle 151 is rotatably located in sleeve 146. An arm 152 attached to the lower end of shaft 151 has an axle carrying a wheel 153. A pneumatic tire is mounted on wheel 153.

Loading conveyor 37 has an elevator assembly comprising a pair of upwardly and outwardly inclined side walls 156 and 157. As shown in FIG. 8, the lower ends of the side walls 156 and 157 are located adjacent brackets 158 secured to the midportions of the beams 124 and 126. A pair of pivots 159 pivotally mount the side walls 156 and 157 on the brackets 158 so that the elevator assembly can pivot upwardly and downwardly relative to the beams 124 and 126. Located between the side walls 156 and 157 is an endless chain conveyor 161. The lower end of conveyor 161 is trained about idler rollers 162 located adjacent the disc assembly 36 and mounted on the frame structure supporting disc assembly 36. The conveyor 161 extends upwardly between the side walls 156 and 157 and is in driving engagement with upper drive rollers or sprockets (not shown) connected to a hydraulic drive motor 163. As shown in FIG. 8, drive motor 163 is secured to the upper end of side wall 157. Motor 163 is connected to a flow control unit 163A used to control the speed of the motor 163 thereby regulating the speed of the conveyor 161 independently of the speed of operation of the remainder of the machine. An on-off valve can be connected to control unit 163A whereby motor 163 can be stopped by the operator of the machine. Valve can be operated from tractor 21.

A plurality of support rollers 164 rotatably mounted on the side walls 156 and 157 support the upper run of conveyor 161. Conveyor 161 has a plurality of spaced beet engaging fingers 166 that facilitate the movement of the beets with the movement of the conveyor. A plurality of guide rods 167 mounted on the side walls 156 and 157 are located between the side walls to hold the beets in engagement with the conveyor 161. Conveyor 161 can be a link or spud type chain such as the chains of the conveyors 28 and 31. Other types of material conveying structures can be used to carry the beets upwardly between the side walls 156 and 157.

A discharge chute indicated generally at 168 is secured to the outer ends of the side walls 156 and 157. Discharge chute 168 has a curved housing 169 having a top wall and side walls and a bottom outlet opening. A plurality of downwardly and outwardly directed rods or guides 171 are located adjacent the inner end of the opening to guide the beets away from the loading conveyor 37. A deflector 172 is pivotally mounted by pivots 173 to the outer end of housing 169. A spring 174 biases the deflector 172 towards the rods 171. A similar spring is secured to the opposite side of deflector 172. The deflection 172 is a resilient rubber-like member which acts as a stop panel to prevent the beets from being thrown over the truck or wagon box. Deflector 172 provides the beets with a downward movement into the receiving box. Springs 174 can be replaced with other flexible means such as chains, cords or pivoted links.

Referring to FIG. 9, an H-shaped support indicated generally at 176 is slidably mounted on the arms 131 and 132 and engages midsections of the side walls 156 and 157 to support the side walls at a selected angular position relative to the beams 124 and 126. H-shape support 176 has upright side members 177 and 178 and a middle cross member 179. The lower ends of side members 177 and 178 telescope into the arms 131 and 132 respectively. An expandable and contractable mechanism or link or screw jack indicated generally at 181 is located between the cross member 179 and the end member 133. Link 181 has a first part 182 carrying a pin 183 pivotally connected to an ear 184. Ear 184 is secured by welds or the like to the middle of cross member 179. Link 181 also has a second part 186 carrying a pin 187. Pin 187 is pivotally connected to an ear 188 secured to the middle of end member 133. A connecting part 189 is threaded on the first part 182 and second part 186. Connecting part 189 is rotatable with use of a handle 191 to either expand or contract the link 181 and thereby move the H-shaped support 176 relative to the arms 131 and 132 to either raise or lower the out chute 168. The upper ends of side members 177 and 178 carry rollers 192 and 193. Pins or bolts 194 rotatably mount the rollers 192 and 193 on the side members 177 and 178. As shown in FIG. 10, roller 192 engages a bracket or guide member 196 secured to the side wall 156. Member 196 has a pocket 197 for accommodating the roller 192 to limit downward movement of the side walls 156 and 157.

Referring to FIG. 8, a spring 198 is connected at its upper end to an arm 199 mounted on the upper end of the side member 178. An eye bolt 201 secures the lower end of spring 198 to a cross angle member 202 mounted on the side walls 156 and 157. A similar spring (not shown) is mounted adjacent the outside of side wall 156 and secures the upper end of side member 177 to side wall 156. The springs 198 yieldably support the side walls 156 and 157 and the conveyor structure on the H-shaped support 176.

In use, the tractor 21 tows the machine 20 in the field having rows of beets 22. The crop lifting wheel units 27 are aligned with rows 22, as shown in FIG. 1. On forward movement of the machine, the lifting discs 27A of the pairs of wheels lift the beets from the soil. The spider assembly 38 for each pair of discs 27A quickly removes the beets from between the discs, placing the beets onto the first conveyors 28. The spider assembly 38 is driven with a common hydraulic motor 42 supplied with hydraulic fluid under pressure from pump 49. The first conveyors 28 driven by common hydraulic motor 47 carry the beets onto a cross conveyor 31. The cross conveyor 31 operated by hydraulic motor 48 carries the beets to the receiving end of the grab and cleaning roller assembly 33. The conveyors 28 and 31, being of spaced link or spud construction, allow the dirt associated with lifting of the beets from the soil to fall back onto the ground. Under some operating conditions, the soil will stick to the beets. The rotating rollers 91-94 further remove the dirt from the beets. The spiral ribs 96 and 97 or rollers 92 and 94 have a scrubbing and turning action on the beets which removes soil, trash or foilage from the beets. The rollers 91-94 carry the beets to the disc assembly 36. Disc assembly 36 has a plurality of discs 119 which are rotated in a counter clockwise direction by hydraulic motor 122 to deliver the beets to the receiving area of the loading conveyor 37. Control unit 122A regulates the speed of motor 122 to ensure an even flow of beets to loading elevator. Hydraulic motor 163-functions to move the elevating conveyor 161 and thereby carry the beets to the discharge chute 168. The beets fall out of discharge chute 168 onto the transport vehicle.

Pump 149 is driven through a power takeoff shaft 159 from tractor 21. The pump 149 operates to pump liquid, as oil, from a reservoir mounted on frame 23 to the hydraulic motors 42, 47, 48, 122 and 163. Control structures as hydraulic fluid flow control units 50, 122A and 163A, are used for each of the motors so that the speed of each of the motors can be separately adjusted. This allows the operator to independently control the speed of operation of each portion of the machine, such as conveyor 28, conveyor 31, discs 119 and the loading conveyor 161. Drive 107 provides the power transmitting connection between the power takeoff shaft 51 and the rollers 91-94.

Loading conveyor 37 is pivotally mounted with the pivots 127 on the side of frame 23. The majority of the weight of the elevator 37 is supported on the floating beam and tandem wheel assembly 137. This reduces the weight on the frame 23 of the machine whereby the lifting wheels 27 are not affected by the weight of the loading conveyor 37. The height of the elevator 37, i.e., the side walls 154 and 156 and out chute 168, can be adjusted with the extendable and contractable link 181. This enables the discharge chute 168 to be vertically positioned to accomodate boxes and trailers of different sizes and having different height side walls.

While there has been shown and described a preferred embodiment of the root crop harvesting machine of the invention, it is understood that changes in the structures, materials, and size of structures can be made by those skilled in the art without departing from the invention.

The embodiments of the invention in which an exclusive property or privilege is claimed are defined as follows:

1. A machine for lifting sugar beets from the soil and delivering sugar beets to a selected location comprising: a movable frame, means mounted on the frame for lifting sugar beets rearwardly from the means for lifting beets, second conveyor means mounted on the frame for receiving sugar beets from the first conveyor means and moving the sugar beets transversely of the machine, a grab roller assembly having a plurality of rollers located longitudinally along one side of the frame, said grab roller assembly having an input end and a discharge end, means mounting the grab roller assembly along said one side of the frame, said second conveyor means operable to deliver sugar beets to the input end of the grab roller assembly, elevator means mounted on said one side of the frame for receiving sugar beets from the discharge end of the grab roller assembly and delivering the sugar beets to an elevated selected location, and drive means connected to the first and second conveyor means, grab roller assembly and elevator means to operate the same.

2. The machine of claim 1 wherein: the first and second conveyor means each include transversely spaced rods for carrying the beets.

3. The machine of claim 1 wherein: the drive means includes hydraulic motors connected to the first and second conveyor means for operating the first and second conveyor means and control means connected to each motor to vary the speeds of the motors.

4. The machine of claim 1 wherein: the second conveyor means and grab roller assembly are operably mounted on the frame and located generally in the same horizontal plane.

5. The machine of claim 1 wherein: the grab roller assembly has a plurality of pairs of longitudinal rollers, each pair of rollers having a first roller provided with a spiral outwardly directed rib and a second roller having a smooth cylindrical outside surface located adjacent the first roller, said drive means including means to rotate the first roller and second roller in opposite directions.

6. The machine of claim 5 wherein: the grab roller assembly has a first pair of longitudinal rollers, said first roller of the first pair of rollers being longer than the second roller.

7. The machine of claim 1 wherein: the drive means includes a hydraulic power system having a pump operable to provide a source of hydraulic fluid under pressure, a first hydraulic motor connected to the pump and first conveyor means for driving the first conveyor means, a second hydraulic motor connected to the pump and second conveyor means for driving the second conveyor means and a third hydraulic motor connected to the pump and elevator means for driving the elevator means.

8. The machine of claim 7 including: separate fluid flow control means connected to each motor whereby the speed of each motor can be separately regulated.

9. The machine of claim 7 wherein: the drive means includes mechanical power transmitting means connected to the rollers operable to rotate the rollers.

10. The machine of claim 1 wherein: the elevator means includes a laterally directed elevator frame, pivot means for pivotally mounting the elevator frame on said one side of the movable frame, and a wheel assembly connected to the elevator frame for supporting the elevator means.

11. The machine of claim 10 including: means connected to the elevator frame operable to adjust the elevation of the discharge end of the elevator means.

12. The machine of claim 10 wherein: the elevator frame has a first frame and a second frame, said pivot means pivotally mounting the first frame to the movable frame, second pivot means pivotally mounting the second frame to the first frame, means connecting the wheel assembly to the first frame, and means connected to the first frame, and means connected to the first frame and second frame to hold the first and second frames in a selected relative angular position.

13. The machine of claim 12 wherein: the means connected to the first frame and second frame includes a longitudinally adjustable member operable to adjust the elevation of the discharge end of the elevator means.

14. The machine of claim 10 wherein: the wheel assembly has a longitudinal beam, pivot means connecting a middle section of the beam to the elevator frame, and first and second wheels connected to opposite ends of the beam.

15. The machine of claim 1 wherein: the movable frame has a pair of laterally directed frame members, said elevator means having an elevator frame including beams located adjacent the frame members, pivot means connecting the beams to the frame members, and a wheel assembly connected to the elevator beams for supporting the elevator frame.

16. The machine of claim 15 wherein: the elevator frame has upwardly and outwardly directed side members, an endless conveyor mounted on the side members, pivot means mounting the side members on the beam, upright support means engageable with middle sections of the side members, said support means having a first section secured to the beams and a second section engageable with the first section and movable relative to the first section, and adjustable means for moving the first section relative to the second section to change the elevation of the discharge end of the elevator means.

17. The machine of claim 16 including: biasing means for biasing the second section toward the first section.

18. The machine of claim 16 wherein: the wheel assembly has a longitudinal beam, pivot means connecting a middle section of the beam to the elevator frame, and first and second wheels connected to opposite ends of the beam.

19. The machine of claim 1 including: wheel assembly means mounted on the frame for supporting a part of the frame above the soil, said wheel assembly means having an upright tubular member, means securing the member to the frame, a right angle member having a first upright section located in telescopic relation with the upright tubular member and a second generally horizontal section, an axle secured to the horizontal section, ground engaging wheel means rotatably mounted on the axle, and extendable and contractable means connected to the upright member and first section operable to move the right angle member relative to the tubular member to change the overall length of the tubular member and right angle member thereby change the elevation of the frame relative to the ground.

20. The machine of claim 19 wherein: the extendable and contractable means in an elongated screw extended into the upright tubular member, means rotatably mounting the screw on the upper part of the tubular member, hand crank means mounted on the screw to facilitate rotation of the screw, a threaded member secured to the first upright section, said screw being threaded into the nut whereby on rotation of the screw the right angle member moves relative to the upright tubular member.

21. A machine for lifting beets from the soil and delivering beets to a loading location comprising: a movable frame, means mounted on the frame for lifting beets out of the soil, a grab roller assembly having a plurality of rollers located along one side of the frame, said grab roller assembly having an input end and a discharge end, means mounting the grab roller assembly along one side of the frame, conveyor means mounted on the frame operable to move all of the beets from the means for lifting beets to the input end of the roller assembly, elevator means mounted on said one side of the frame for receiving beets from the discharge end of the roller assembly and delivering the beets to an elevated loading location, and drive means connected to the conveyor means, grab roller assembly and elevator means to operate the conveyor means, grab roller assembly and elevator means.

22. the machine of claim 21 wherein: the drive means includes hydraulic motors connected to the conveyor means and elevator means for operating the conveyor means and elevator means, and control means connected to the hydraulic motors to vary the speeds of the hydraulic motors.

23. The machine of claim 21 wherein: the drive means includes a hydraulic power system having a pump operable to provide a source of hydraulic fluid under pressure, first hydraulic motors connected to the pump and conveyor means for driving the conveyor means, and a second hydraulic motor connected to the pump and elevator means for driving the elevator means.

24. The machine of claim 23 including: separate fluid flow control means connected to each motor whereby the speed of each motor can be separately regulated.

25. The machine of claim 21 wherein: the drive means includes mechanical power transmitting means connected to the rollers operable to rotate the rollers.

26. The machine of claim 21 wherein: the elevator means includes a laterally directed elevator frame, pivot means for pivotally mounting the elevator frame on said one side of the movable frame, and a wheel assembly connected to the elevator frame for supporting the elevator means.

27. The machine of claim 26 including: means connected to the elevator frame operable to adjust the elevation of the discharge end of the elevator means.

28. The machine of claim 26 wherein: the elevator frame has a first frame and a second frame, said pivot means pivotally mounting the first frame to the movable frame, second pivot means pivotally mounting the second frame to the first frame, means connecting the wheel assembly to the first frame, and means connected to the first frame and second frame to hold the first and second frames in a selected relative angular position.

29. The machine of claim 28 wherein: the means connected to the first frame and second frame includes a longitudinally adjustable member operable to adjust the elevation of the discharge end of the elevator means.

30. The machine of claim 26 wherein: the wheel assembly has a longitudinal beam, pivot means connecting a middle section of the beam to the elevator frame, and first and second wheels connected to opposite ends of the beam.

31. The machine of claim 21 wherein: the movable frame has a pair of laterally directed frame members, said elevator means having an elevator frame including beams located adjacent the frame members, pivot means connecting the beams to the frame members, and a wheel assembly connected to the elevator beams for supporting the elevator frame.

32. The machine of claim 31 wherein: the elevator frame has upwardly and outwardly directed side members, an endless conveyor mounted on the side members, pivot means mounting the side members on the beams, upright support means engageable with middle sections of the side members, said support means having a first section secured to the beams and a second section engageable with the first section and movable relative to the first section, and adjustable means for moving the first section relative to the second section to change the elevation of the discharge end of the elevator means.

33. The machine of claim 32 including: biasing means for biasing the second section toward the first section.

34. The machine of claim 32 wherein: the wheel assembly has a longitudinal beam, pivot means connecting a middle section of the beam to the elevator frame, and first and second wheels connected to opposite ends of the beam.

35. A machine for lifting sugar beets from the soil and delivering sugar beets to a selected location comprising: a frame, first means mounted on the frame for lifting sugar beets out of the soil, second means mounted on the frame for carrying sugar beets away from the first means, a grab roller assembly having a plurality of elongated side-by-side rollers, said grab roller assembly having an input end and a discharge end, said second means having a sugar beet discharge end located adjacent the input end of said grab roller assembly whereby sugar beets are moved by the second means onto the input end of the grab roller assembly, means mounting the rollers on the frame and positioning the rollers in the general horizontal plane of the discharge end of the second means whereby all of the sugar beets move the length of the grab roller assembly from the input end to the discharge end thereof, third means for receiving sugar beets from the discharge end of said grab roller assembly and discharging the sugar beets to a selected location, means mounting the third means on the frame adjacent to the discharge end of the grab roller assembly, and drive means connected to the second means, grab roller assembly and the third means to operate the second means, grab roller assembly, and the third means whereby sugar beets are moved by the second means to the input end of the grab roller assembly, moved by the grab roller assembly along the length of the rollers, and moved by the third means from the discharge end of the grab roller assembly to the selected location.

36. The machine of claim 35 wherein: the grab roller assembly has a plurality of pairs of longitudinal side-by-side rollers, each pair of rollers having a first roller and a second roller, said first roller having a spiral outwardly directed rib, said second roller having a smooth cylindrical outside surface, said drive means including means to rotate the first roller and second roller in opposite directions.

37. The machine of claim 36 wherein: the grab roller assembly has a first pair of longitudinal side-by-side rollers, one of said rollers of the first pair of rollers being longer than the other roller.

38. The machine of claim 35 wherein: the second means comprises a first conveyor for moving sugar beets rearwardly away from the first means and a second conveyor located behind the first conveyor for receiving sugar beets from the first conveyor and moving the sugar beets to the input end of the grab roller assembly.

39. The machine of claim 38 wherein: the first conveyor and second conveyor each include transversely spaced rods for carrying the sugar beets.

40. The machine of claim 38 wherein: the grab roller assembly is mounted on the frame adjacent one side of the first conveyor with the input end located adjacent the discharge end of the second conveyor.

41. The machine of claim 35 wherein: the second means comprises a pair of endless conveyors operable to move sugar beets rearwardly away from the first means, and a second transverse endless conveyor located behind the pair of conveyors for receiving sugar beets from said pair of conveyors and moving the sugar beets transversely to the input end of the grab roller assembly, said grab roller assembly being mounted on the frame adjacent one of the pair conveyors with the input end located adjacent the discharge end of the second conveyor.

42. A machine for lifting sugar beets from the soil and delivering the sugar beets to a selected location comprising: a frame, wheel means supporting part of the frame on the soil, a plurality of sugar beet lifting wheel assemblies for lifting sugar beets out of the soil, a pair of first conveyors mounted on the frame for carrying sugar beets rearwardly from the lifting wheels, a second transverse conveyor mounted on the frame behind the first conveyor means for receiving sugar beets from the first conveyor means and moving the sugar beets transversely of the frame, a grab roller assembly including a plurality of side-by-side rollers having an input end and a discharge end, means rotatably mounting the rollers of the grab roller assembly on the frame and positioning the rollers longitudinally adjacent one side of the machine, said second conveyor means having a discharge end located adjacent the input end of the grab roller assembly whereby all of the sugar beets moved by the second conveyor are directed onto the input end of the grab roller assembly, said sugar beets moving the length of the grab roller assembly from the input end to the discharge end thereof, means mounted on said frame for receiving the sugar beets from the discharge end of the grab roller assembly and delivering the sugar beets to a selected location, and drive means connected to the first and second conveyor means, grab roller assembly, and means to receive sugar beets from the grab roller assembly to operate the first and second conveyor means, grab roller assembly and means to receive the sugar beets from the grab roller assembly and deliver the sugar beets to the selected location.

43. The machine of claim 42 wherein: the grab roller assembly has a plurality of parts of longitudinal rollers, each pair of rollers having a first roller and a second roller located adjacent the side of the first roller, said first roller having a spiral outwardly directed rib, said second roller having a smooth cylindrical outside surface, said drive means including means to rotate the first roller and the second roller in opposite rotational directions.

44. The machine of claim 43 wherein: the grab roller assembly has a first pair of longitudinal rollers, one of said first pair of rollers being longer than the other roller.

45. The machine of claim 42 wherein: the pair of first conveyors and the second conveyors each include laterally spaced rods for carrying the sugar beets.

* * * * *

UNITED STATES PATENT AND TRADEMARK OFFICE
CERTIFICATE OF CORRECTION

PATENT NO. : 4,049,058
DATED : September 20, 1977
INVENTOR(S) : Fred W. Eisenhardt et al.

It is certified that error appears in the above-identified patent and that said Letters Patent are hereby corrected as shown below:

Column 1, line 19, "so" should be -- do --.

Column 1, line 31, "2,608,814" should be -- 2,608,815 --.

Column 1, line 53, "roller" should be -- rollers --.

Column 3, line 42, after "and", insert -- 31 --.

Column 4, line 8, "dirve" should be -- drive --.

Column 5, line 28, "roler" should be -- roller --.

Column 5, line 59, after "and", insert -- 3 --.

Column 7, line 31, "deflection" should be -- deflector --.

Claim 20, line 2, "in" should be -- is --.

Claim 43, line 2, "parts" should be -- pairs --.

Signed and Sealed this

Third Day of January 1978

[SEAL]

Attest:

RUTH C. MASON
Attesting Officer

LUTRELLE F. PARKER
Acting Commissioner of Patents and Trademarks